Sept. 11, 1923.  1,467,560

F. W. SEECK

DIFFERENTIAL MECHANISM

Filed April 13, 1922  3 Sheets-Sheet 1

Inventor:
Ferdinand W. Seeck
by Atty.

Sept. 11, 1923.
F. W. SEECK
DIFFERENTIAL MECHANISM
Filed April 13, 1922   3 Sheets-Sheet 2
1,467,560
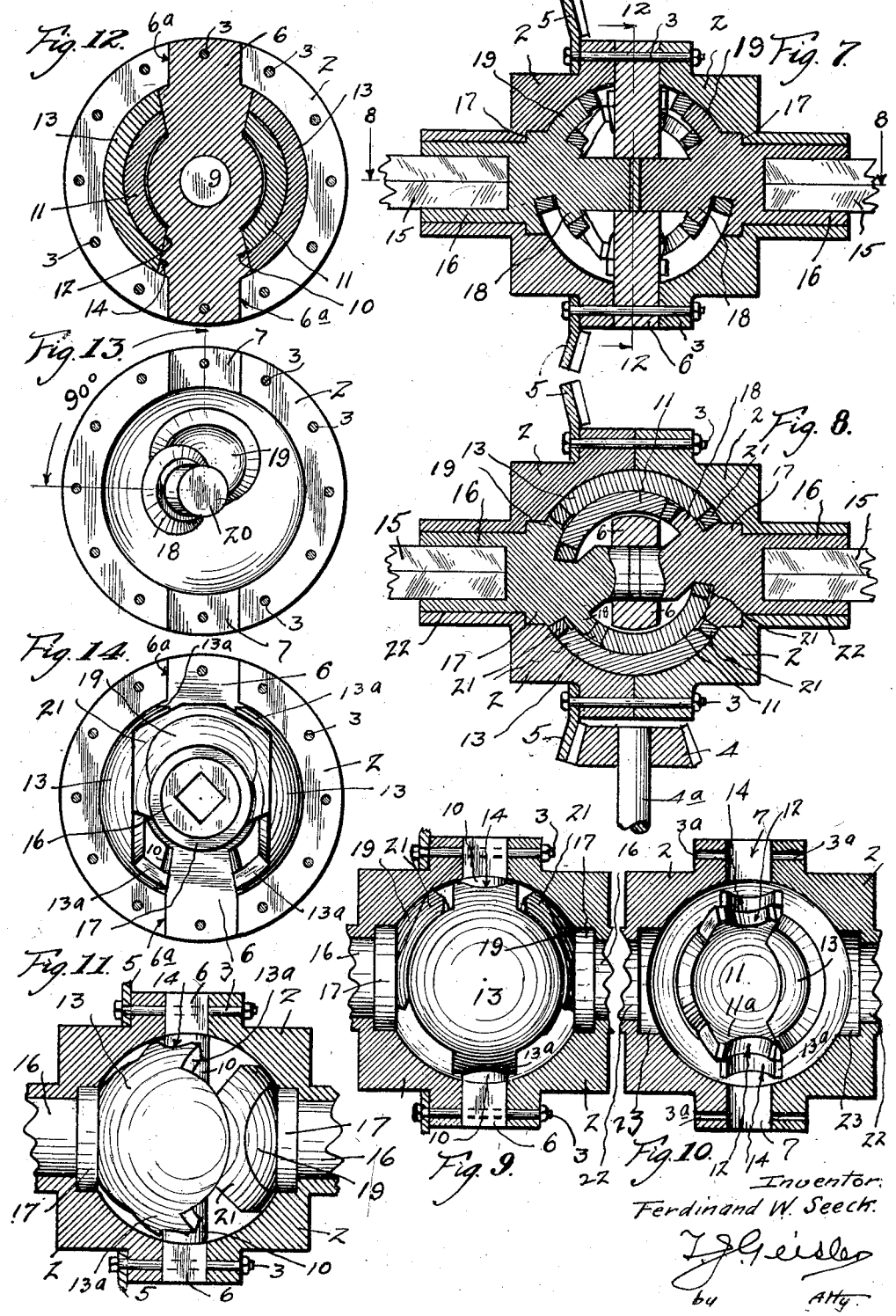
Inventor:
Ferdinand W. Seeck Sept. 11, 1923.
F. W. SEECK
DIFFERENTIAL MECHANISM
Filed April 13, 1922    3 Sheets-Sheet 3
1,467,560
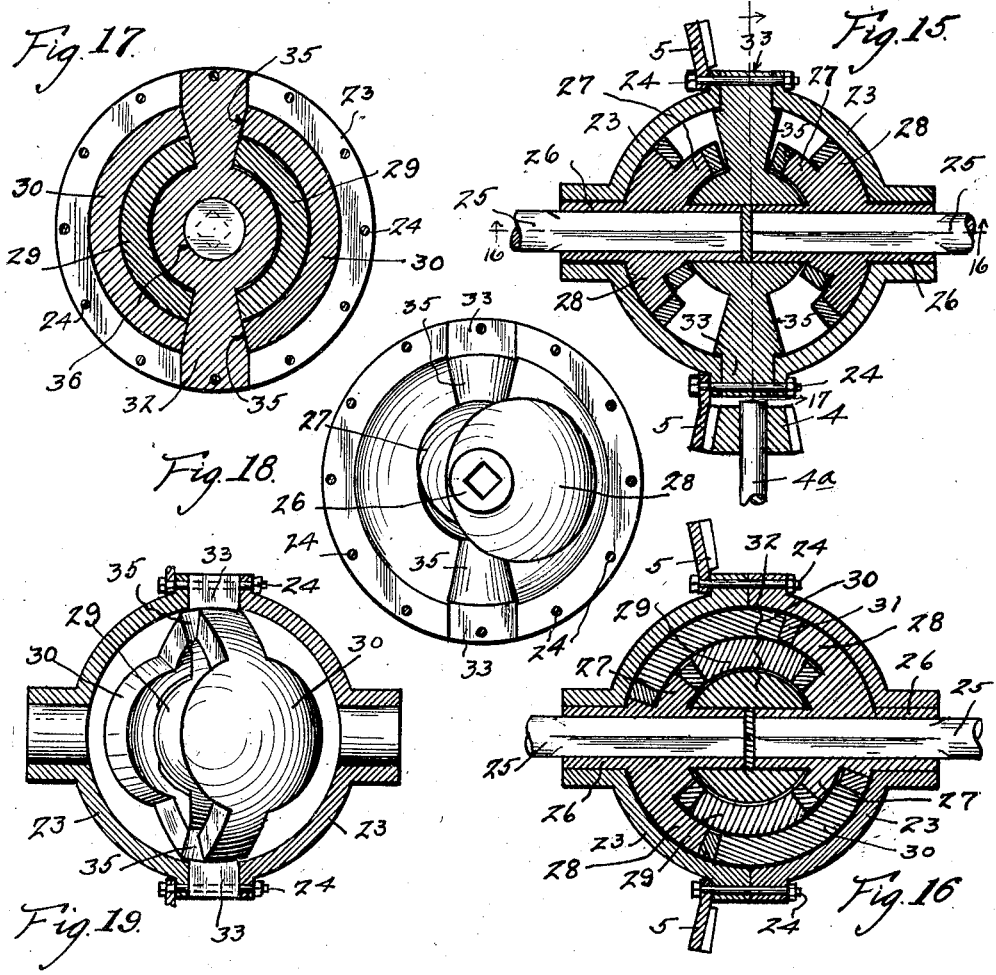
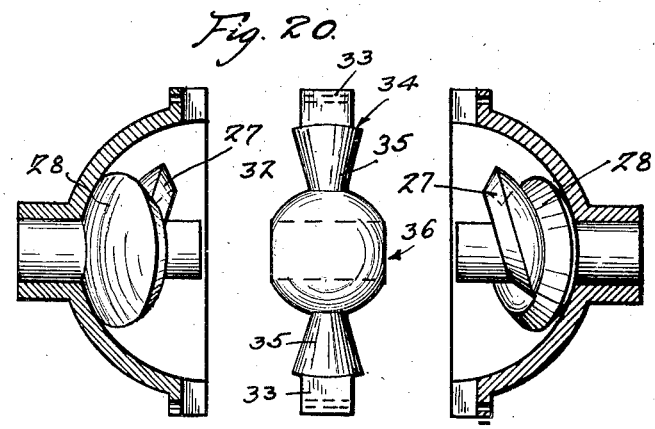
Inventor
Ferdinand W. Seeck Patented Sept. 11, 1923.

1,467,560

UNITED STATES PATENT OFFICE.

FERDINAND W. SEECK, OF LEBANON, OREGON.

DIFFERENTIAL MECHANISM.

Application filed April 13, 1922. Serial No. 552,102.

*To all whom it may concern:*

Be it known that I, FERDINAND W. SEECK, a citizen of the United States, and a resident of Lebanon, county of Linn, and State of Oregon, have invented a certain new and useful Improvement in Differential Mechanism, of which the following is a specification.

My invention relates to the mechanism for driving wheels of a self driven vehicle.

The object of my invention is to provide a simple gearless power transmitting mechanism adapted to drive the section of a divided axle simultaneously at the same rate, and at the same time permitting each of the axle sections to have a relatively different rate of rotation as required in driving over curves in the road.

A further object is to provide an improvement over Patent No. 1,278,231, issued Sept. 10, 1918, to myself.

In the present invention I have provided parts which operate similarly but which are built to withstand greater power and are capable of being manufactured more easily.

A further object is to provide means for making the device patented under the date and number previously referred to adaptable to connect with a full floating or semi-floating axle.

A further object is to provide a gearless differential in which the axles or stub shafts in which the axles are fixed have a bearing provided in the middle of the differential.

A further object is to provide a gearless differential in which the frictional surfaces are large and thus a greater frictional hold is presented. The abutting edges of the transmission members, cranks and filler pieces, are radial and thus any twisting pressure exerted upon the separate parts tends to force them outward against the differential casing and therefore they have a tendency to bind with the said casing when the force is thus applied.

A further object is to provide stub shafts or axle sections in which the axles are seated, in which the inner end is made solid and thus more strength and greater eccentric throws can be attained.

I attain my objects in mechanism comprising a driven differential case, a divided axle whose sections are seated in a stub shaft journaled in the case, said stub shaft having eccentric elements positioned thereon, a fixed transverse member fixed to the differential case and positioned so as to form an inner support for the ends of the stub shafts, oscillable transmission members bearing on each other and against the crank case on one side and the transverse member on the other; the cheek plates being so adapted as to cause eccentric motion from one stub shaft to be transmitted oppositely to the other stub shaft. When said stub shafts are travelling at different rates, the cheek plates being so adapted however to interlock with the eccentric positioned on said stub shafts, cause all parts to revolve as a unitary mass.

The construction and cooperation of the parts of my invention are illustrated in the accompanying drawings, in which:

Fig. 7 is a central longitudinal section of the differential housing and the differential gearing;

Fig. 8 is a plan section taken on the line 8—8 of Fig. 7;

Fig. 9 is a sectional view similar to Fig. 7 with the differential gearing shown in full;

Fig. 10 is a similar longitudinal section as Fig. 9, but has the transverse member, stub shafts and the two nearest cheek plates removed, and shows the two opposite cheek plates in their relative position;

Fig. 11 is a sectional view similar to Fig.

Figure 1:
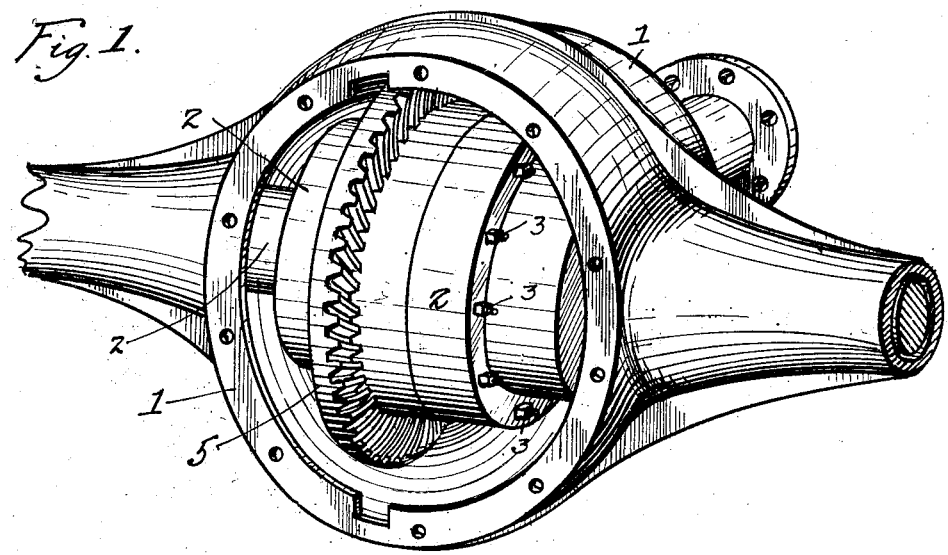
Fig. 1 is a fragmentary perspective view of the differential case enclosing the mechanism comprised in my present invention; the differential case being contained in the rear housing of the automobile as usual.
Figures 2, 3, 4:
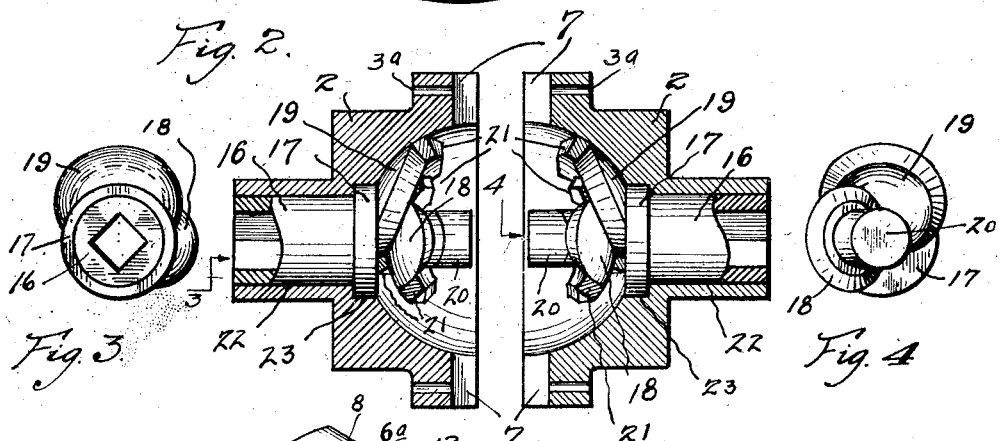
Fig. 2 is a sectional view showing the two halves of the casing and the relation of the eccentrics in respect to each other.
Fig. 3 is an outer end view of one of the stub shafts and shows that the eccentrics are positioned 90° apart; looking in the direction of arrow 3.
Fig. 4 is an inner view of the other stub shaft taken from the inner end looking in direction of arrow 4.
Figures 5, 6:
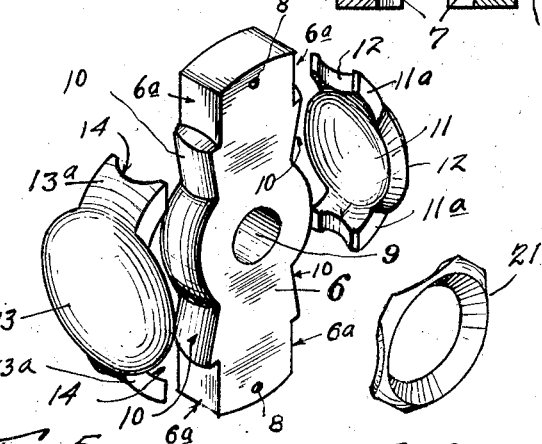
Fig. 5 is a perspective view of the transverse member and two cheek plates positioned slightly apart from the same, indicating the approximate position in which they are seated on the transverse member.
Fig. 6 is a perspective view of one of the disk washers.

9, differing only in that the cheek plate has been oscillated due to the action of the eccentrics;

Fig. 12 is a view of the right hand section of the differential housing taken on the line 12—12 of Fig. 7 showing differential gearing in section;

Fig. 13 is a similar view as Fig. 12 showing however merely one of the stub shafts and the eccentric elements thereof;

Fig. 14 is a similar view as Fig. 7 with the exception that the differential gearing is shown in full;

Fig. 15 is a central longitudinal section of a combination housing and gearing of a some what different construction to that shown in Fig. 7.

Fig. 16 is a section taken on the line 16—16 of Fig. 15;

Fig. 17 is a view of the right hand section of differential housing taken on the line 17—17 of Fig. 15 showing the differential gearing in section;

Fig. 18 is a similar view showing the stub shafts in full and the eccentric element thereof;

Fig. 19 is a longitudinal section similar to Fig. 15 with all the parts of cheek plates shown in their relative position; and Fig. 20 is a similar section but with the transverse member and stub shafts shown in full and the separate parts spaced slightly from each other.

The operation and construction of my invention is as follows: The principle involved in my gearless differential is the same as in the ordinary form of gear differential and the analogy will be explained in detail. Both differentials are enclosed in a differential housing 1. The case 2 which encloses the moving parts of my invention is split and held together by bolts 3 placed thru the holes 3ª. Power is received from the propelling shaft 4ª thru the bevel pinion 4 which meshes with the ring gear 5 bolted to the differential casing 2. The parts enumerated so far are similar to the standard forms of gear differentials as now manufactured.

A member 6 is fixed transversely between the two casing sections 2ª, 2ᵇ and recessed in the same as at 7 and thus rotates with the casing. This member has square sections 6ª which fit in the recesses 7, and shoulders 6ᵇ on both ends of members 6 prevent lateral movement of the same. A hole 8 is positioned in both ends thru which one of the bolts 3 can be placed. This member 6 performs substantially the same functions as the spider in a gear differential. This fixed member has an eye 9 in its middle. This fixed member also has curved surfaces as 10. The transmission members 11 are positioned against the curved surfaces 10 on the fixed member 6 and have ears 11ª in which are recessed portions as 12 which correspond to the curved portions 10 on which they ride. Other transmission members 13 are positioned over the top of the members 11 bearing on the same surfaces and having similar ears 13ª with recessed portions 14. The members 13 bear on the outside of the members 11 and inside of sections 2ª and 2ᵇ. There are two sets of these transmission members in the differential mechanism I have illustrated in the accompanying drawings, one set of each being placed on each edge as 10 of the fixed member 6 and positioned so as to lie in the path of motion of the fixed transverse member and thus to be rotated by the same. Divided axle sections 15 are connected to the drive wheels of an automobile as in the present form of construction. These are positioned in the stub shafts 16 and recessed in the same, the stub sections providing sockets as 16' and correspond in shape to the periphery of the end of the divided axles. This allows the divided axles to be withdrawn from the differential without dismembering the differential but prevents the differential from turning without turning the axles and therefore the wheels. This allows for floating axles. The stub shafts 16 are made with a shoulder 17 which acts as a wearing member for the outward thrust of these axle sections. The axle sections are made with integral crank elements as 18 and 19, these crank elements preferably being arranged so that the offsets shall be 90° apart, as seen in Fig. 13, so that when one of them is on center the other one shall be on the point of maximum throw. The projections 18 function with the transmission members 11 and the crank elements 19 function with the transmission elements 13. The stub shafts 16 are made with trunnions 20 which fit in the eye 9 in the fixed member 6. Thus this eye 9 provides a bearing for the ends of the axle sections. The crank elements in my device correspond to the differential gears in the ordinary type of gear differential and the transmission elements correspond to the spider gears. The filler members 21 are positioned between the rims of the eccentric portions of the crank elements and the corresponding rims of the transmission members so as to provide longer bearing surfaces between these members. It can readily be seen that without these filler plates the only contact possible between the circular members would be at their point of tangency. The transmission members 11 and 13, the filler members 21 and the crank elements 18 and 19 are all made with radial edges so that any twisting strain between the members will force them against the casing of the differential and thus provide a substantial frictional resistance to the device. The inside surfaces of the casing sections are concave and the outside surface of the transmission members 13 and the crank elements 19 are convex and bear smoothly against each other. The inside surfaces of the members 19 and 13 are similarly concave and the outside surface of the crank elements 18 and the transmission members 11 are convex and bear within the inner surfaces of the transmission members 13 and the crank elements 19.

Thus an outside view of the mechanism with the casing removed would resemble a true sphere mounted on a shaft. The axle sections 16 are journaled in the driven case 2 as at 22. The shoulder 17 of the axle sections bears against the shoulder 23 in the casing sections.

In Figs. 15, 16, 17, 18, 19 and 20, a slight variation has been made to show that the principle of my invention can be utilized in various mechanical constructions without departing from the principle involved. In these figures the driven case sections 23 are held together by bolts 24. Divided axles 25 are mounted in axle sections 26. These sections have crank elements 27 and 28 which function with transmission members 29 and 30 respectively. Filler plates 31 are positioned between the rims of the eccentric portions of the crank elements and the rims of the transmission members. The fixed member 32 has angular portions 33, shoulder 34, curve portions 35 and eye 36 which performs similar functions to the similar portions in previous figures.

The operation of my device is as follows: As is well known a differential allows differential motion between two driving wheels of a vehicle. When rounding a corner or otherwise the wheels are allowed different rates of rotation due to the greater or lesser arc.

The difficulty in gear driven differentials is that power is always given to the wheel having the least resistance and thus if one wheel has no resistance the car will not be given forward motion. In my type the eccentric portions of axle sections are thru the fixed transverse member 6 or 33 and the transmission members 11 and 13, or 29 and 30. If the wheels present equal frictional resistance the device will give power equally as the eccentric portions will present themselves as crank elements and prevent any rotation without carrying the transmission members along with them. If one side however, is allowed slightly decreased frictional resistance the transmission members will wedge the other member tightly against the case and hold the same and thus power will be transmitted thru the wedge section and the other will be allowed to rotate without receiving the power. It can be understood that if the crank throws are very large, however, that they will overcome the frictional resistance of the parts with each other and turn the same irrespective of any binding action and also if the crank throws are too small the faster moving wheel will not present enough power to overcome the parts within the case. It is therefore necessary to vary the size of the throws so as to correspond to the friction of the parts with each other, and the size of the machine. By experimentation I have found that I can vary these throws sufficiently so that under ordinary circumstances such as turning corners I can allow the inside wheel to deliver approximately 90% of the power and the outer or faster moving wheel about 10% and thus relieve any drag upon the machine. This of course can be adjusted to any proportion merely by changing the size of the offset portions of the crank elements. The frictional resistance is increased in my present invention because the sides of the different members are radial and as heretofore explained, any twisting or torque between the members causes them to wedge more tightly against the case and therefore increase the frictional contact.

I claim:

1. In a differential mechanism of the character described, the combination of a driven case, axle sections journaled in each side of the case and carrying part of the elements of the differential mechanism, a member fixed transversely and centrally in the case, normal with the latter's axis of rotation, transmission members with connections between them, the inner ends of said axle sections journalling in said fixed member.

2. In a differential mechanism of the character described, the combination of a driven case, axle sections journaled in each side of the case, a crank element carried by each axle section, a member fixed transversely and centrally in the case, normal with the latter's axis of rotation, transmission elements mounted on the fixed member for oscillating about its longitudinal axis, connections between the crank elements and the transmission members, the inner ends of said axle sections journalling in said fixed member.

3. A differential mechanism comprising, a driven case, axle sections journaled in each side of the case, a member fixed transversely and centrally in the case, normal with the latter's axis of rotation, a crank element comprising eccentric portions disposed at an angle with each other on each axle section, separate transmission elements bearing on opposite longitudinal faces of said fixed member, and adapted for oscillating about the longitudinal axis of the latter, said transmission elements being arranged in the path of motion of said fixed member, and filler members between the rims of said eccentric portions of the crank elements and the rims of said transmission members.

4. A differential mechanism comprising a driven case, axle sections journaled in each side of the case, a member fixed transversely and centrally in the case, normal with the latter's axis of rotation, a one piece crank element comprising eccentric portions disposed at an angle with each other on each axle section separate transmission elements bearing on opposite longitudinal faces of said fixed member and adapted for oscillating about the longitudinal axis of the latter, said transmission elements being arranged in the path of motion of said fixed member, and filler members between the rims of said eccentric portions of the crank elements and the rims of said transmission members.

5. A differential mechanism comprising a driven case, axle sections journaled in each side of the case, such axle sections provided with crank elements each comprising eccentric portions disposed at an angle with each other, a member fixed transversely and centrally in the case, normal with the latter's axis of rotation, the inner ends of said axle sections journaling in said member, separate transmission elements bearing on the opposite longitudinal faces of the said fixed member, and adapted for oscillating about the longitudinal axis of the latter, and filler members between the rims of said eccentric portions of the crank elements and the rims of said transmission members.

6. A differential mechanism comprising a driven case, axle sections journaled in each side of the case, such axle sections provided with crank elements each comprising eccentric portions disposed at an angle with each other, a member fixed transversely and centrally in the case, normal with the latter's axis of rotation, the inner ends of said axle sections journaling in said fixed member, the axle sections being adapted to constitute each a socket in which to receive another axle section, separate transmission elements bearing on opposite longitudinal faces of the said fixed member, and adapted for oscillating about the longitudinal axis of the latter, and filler members between the rims of said eccentric portions of the crank elements and the rims of said transmission members.

7. A differential mechanism comprising a driven case, axle sections journaled in each side of the case, such axle sections provided with crank elements each comprising eccentric portions disposed at an angle with each other, a member fixed transversely and centrally in the case, normal with the latter's axis of rotation, the axle sections being adapted to constitute each a socket in which to receive another axle section, separate transmission elements bearing on opposite longitudinal faces of the said fixed member, and adapted for oscillating about the longitudinal axis of the latter, and filler members between the rims of said eccentric portions of the crank elements and the rims of said transmission members.

8. A differential mechanism comprising, a driven case, axle sections journaled in each side of the case, such axle sections provided with crank elements each comprising eccentric portions disposed at an angle with each other, a member fixed transversely and centrally in the case, normal with the latter's axis of rotation, the fixed member being provided with a journal bearing coincident with the axis of rotation of the case, and the said axle sections having each on their inner end a trunnion portion journaled in said journal bearing, separate transmission elements bearing on opposite longitudinal faces of the said fixed member, and adapted for oscillating about the longitudinal axis of the latter, and filler members between the rims of said eccentric portions of the crank elements and the rims of said transmission members.

9. A differential mechanism comprising a driven case, axle sections journaled in each side of the case, such axle sections provided with integral crank elements each comprising eccentric portions disposed at an angle with each other, a member fixed transversely and centrally in the case, normal with the latter's axis of rotation, the inner ends of said axle sections journaling in said fixed member separate transmission elements bearing on opposite longitudinal faces of the said fixed member, and adapted for oscillating about the longitudinal axis of the latter, and filler members between the rims of said eccentric portions of the crank elements and the rims of said transmission members.

10. A differential mechanism comprising a driven case, axle sections journaled in each side of the case, such axle sections provided with integral crank elements each comprising eccentric portions disposed at an angle with each other, a member fixed transversely and centrally in the case, normal with the latter's axis of rotation, the inner ends of said axle sections journaling in said fixed member, the axle sections being adapted to constitute each a socket in which to receive another axle section, separate transmission elements bearing on opposite longitudinal faces of the said fixed member, and adapted for oscillating about the longitudinal axis of the latter, and filler members between the rims of said eccentric portions of the crank elements and the rims of said transmission members.

11. A differential mechanism comprising a driven case, axle sections journaled in each side of the case, such axle sections provided with crank elements each comprising eccentric portions disposed at an angle with each other, a member fixed transversely and centrally in the case, normal with the latter's axis of rotation, the inner ends of said axle sections journaling in said fixed member, the axle sections being adapted to constitute each a socket in which to receive another axle section, said sockets terminating at a substantial distance from the inner ends of the axle sections for the purpose described, separate transmission elements bearing on opposite longitudinal faces of the said fixed member, and adapted for oscillating about the longitudinal axis of the latter, and filler members between the rims of said eccentric portions of the crank elements and the rims of said transmission members.

12. A differential mechanism comprising a driven case, axle sections journaled in each side of the case, a member fixed transversely and centrally in the case, normal with the latter's axis of rotation, a crank element comprising eccentric portions disposed at an angle with each other on each axle section, separate transmission elements bearing on opposite longitudinal faces of said fixed member, and adapted for oscillating about the longitudinal axis of the latter, said transmission elements being arranged in the path of motion of said fixed member, filler members between the rims of said eccentric portions of the crank elements and the rims of said transmission members, the abutting edges of said differential elements being arranged to lie in planes radial to the axis about which said transmission elements rotate.

13. In a differential mechanism of the character described the combination of, a driven case, axle sections journaled in each side of the case, a member fixed transversely and centrally in the case, normal with the latter's axis of rotation, separate transmission elements mounted on the fixed member for oscillating about its longitudinal axis, said transmission elements bearing on opposite longitudinal faces of said fixed member and being arranged in the path of motion of the latter.

14. In a differential mechanism of the character described the combination of, a driven case, axle sections journaled in each side of the case, a member fixed transversely and centrally in the case, normal with the latter's axis of rotation, separate transmission elements mounted on the fixed member for oscillating about its longitudinal axis, said transmission elements bearing on opposite longitudinal faces of said fixed member and being arranged in the path of motion of the latter, the inner ends of said axle sections journaling in said fixed member.

15. In a differential mechanism of the character described in combination of, a driven case, axle sections journaled in each side of the case, a member fixed transversely and centrally in the case, normal with the latter's axis of rotation, separate transmission elements mounted on the fixed member for oscillating about its longitudinal axis, said transmission elements bearing on opposite longitudinal faces of said fixed member and being arranged in the path of motion of the latter, the inner ends of said axle sections journaling in said fixed member, the abutting edges of said differential elements being arranged to lie in planes radial to the axis about which said transmission elements rotate.

16. In a differential mechanism of the character described the combination of, a driven case, axle sections journaled in each side of the case and carrying part of the elements of the differential mechanism, the axle sections being provided with a peripheral flange to receive the outward thrust thereon, a member fixed transversely and centrally in the case, normal with the latter's axis of rotation, and connections between the transmission members.

17. In a differential mechanism of the character described the combination of, a driven case, axle sections journaled in each side of the case and carrying part of the elements of the differential mechanism, the axle sections being provided with a peripheral flange to receive the outward thrust thereon, a member fixed transversely and centrally in the case, normal with the latter's axis of rotation, connections between the transmission members, the inner ends of said axle sections journaling in said fixed member.

18. In a differential mechanism of the character described the combination of, a driven case, axle sections journaled in each side of the case, a crank element carried by each axle section, a member fixed transversely and centrally in the case, normal with the latter's axis of rotation, separate transmission elements mounted on the fixed member for oscillating about its longitudinal axis, said transmission elements bearing on opposite longitudinal faces of said fixed member and being arranged in the path of motion of the latter, the inner ends of said axle sections journaling in said fixed member.

19. In a differential mechanism of the character described the combination of, a driven case, axle sections journaled in each side of the case, a crank element carried by each axle section, a member fixed transversely and centrally in the case, normal with the latter's axis of rotation, separate transmission elements mounted on the fixed member for oscillating about its longitudinal axis, said transmission elements bearing on opposite longitudinal faces of said fixed member and being arranged in the path of motion of the latter, the inner ends of said axle sections journalling in said fixed member, the abutting edges of said differential elements being arranged to lie in planes radial to the axis about which said transmision elements rotate.

20. In a differential mechanism of the character described the combination of, a driven case, axle sections journaled in each side of the case, a crank element carried by each axle section, a member fixed transversely and centrally in the case, normal with the latter's axis of rotation, separate transmission elements mounted on the fixed member for oscillating about its longitudinal axis, said transmission elements bearing on opposite longitudinal faces of said fixed member and being arranged in the path of motion of the latter, connections between the crank elements and the transmission members, the inner ends of said axle sections journaling in said fixed member, the abutting edges of said differential elements being arranged to lie in planes radial to the axis about which said transmission elements rotate.

21. In a differential mechanism, a case the interior wall surface of which is concaved, transmission elements having the form of concentric segments of a hollow sphere, one of the latter having constant bearing substantially its entire outer face on the inner wall of the case, and said transmission elements also having constant bearing on each other.

22. In a differential mechanism, a case the interior wall surface of which is concaved, transmission elements having the form of concentric segments of a hollow sphere, and a diametric member in the case on which the edges of said transmission elements bear, one of the latter having constant bearing on the inner wall of the case, and said transmission elements also having constant bearing on each other.

FERDINAND W. SEECK.